(12) United States Patent
Ogaki et al.

(10) Patent No.: US 6,643,028 B1
(45) Date of Patent: Nov. 4, 2003

(54) METHOD FOR STORING IMAGE OF ORIGINAL AND IMAGE PROCESSING APPARATUS

(75) Inventors: Takeshi Ogaki, Tama (JP); Akinori Iwase, Yokosuka (JP); Akihiko Fujiwara, Yokohama (JP); Kazuhiro Ogura, Kawasaki (JP); Yoshiko Takeda, Yokohama (JP)

(73) Assignees: Kabushiki Kaisha Toshiba, Kawasaki (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/452,470

(22) Filed: Dec. 2, 1999

(30) Foreign Application Priority Data

Dec. 2, 1998  (JP) ............................................ 10-342714
Dec. 8, 1998  (JP) ............................................ 10-348620

(51) Int. Cl.$^7$ ................................................ G06K 15/00
(52) U.S. Cl. ...................................... 358/1.6; 358/1.12
(58) Field of Search .................... 358/1.6, 1.1, 1.5, 358/1.13, 1.12, 1.14, 1.16, 505, 496; 378/14, 16, 17, 18, 19, 361, 373, 401

(56) References Cited

U.S. PATENT DOCUMENTS

| | | | |
|---|---|---|---|
| 5,311,331 A | 5/1994 | Cha ............................ | 358/501 |
| 5,325,527 A | * 6/1994 | Cwikowski et al. ........ | 709/222 |
| 5,493,415 A | 2/1996 | Mita et al. .................. | 358/444 |
| 5,590,245 A | * 12/1996 | Leamy et al. ............... | 345/418 |
| 5,757,958 A | 5/1998 | Shimizu et al. ............. | 382/181 |
| 5,764,866 A | 6/1998 | Maniwa ...................... | 395/114 |
| 5,768,483 A | 6/1998 | Maniwa et al. ............. | 395/114 |

FOREIGN PATENT DOCUMENTS

| | | |
|---|---|---|
| JP | 4-79473 | 3/1992 |
| JP | 9-218617 | 8/1997 |
| JP | 10-32666 | 2/1998 |
| JP | 10-40354 | 2/1998 |
| JP | 10-283132 | 10/1998 |
| JP | 11-122414 | 4/1999 |
| JP | 11-184879 | 7/1999 |

* cited by examiner

*Primary Examiner*—Arthur G. Evans
(74) *Attorney, Agent, or Firm*—Foley & Lardner

(57) ABSTRACT

In this invention, a digital copying machine to be connected to a network feeds originals in each document unit for each sheet by use of an ADF to read the images of the originals and prints the read images in each document unit for each page in a printing form selected by the user. Therefore, a plurality of original images read in each document unit can be effectively confirmed in accordance with the purpose of the user on the spot where the reading operation is effected. Further, the actual concentration can be adjusted while observing reduced images on the confirmation sheet and inputting of an actual image and inputting for correction can be easily attained. In a case where a specified page among a plurality of originals is scanned again, all of the originals are set on the original table of the ADF without extracting the specified page from the originals and the specified page can be scanned again. Therefore, the pages of the originals can be kept in order. Further, since only the necessary page is scanned, time can be saved. Therefore, specification of rescanning can be easily made and a sheaf of originals (document) can be kept as it is.

17 Claims, 10 Drawing Sheets

FIG. 4A REDUCING/SYNTHESIZING

FIG. 4B EXTRACTING/SYNTHESIZING (CENTRAL PORTION)

FIG. 4C EXTRACTING/SYNTHESIZING (LOWER CENTRAL PORTION)

FIG. 4D EXTRACTING/SYNTHESIZING (UPPER PORTION)

| JOBID | USER ID | REGISTRATION DATE AND TIME | POINTER TO IMAGE |
|---|---|---|---|
| 1 | 1001 | AUG. 18, 1998   10:35:10 | File 001 |
| 2 | 1002 | AUG. 18, 1998   10:40:50 | File 002 |
| 3 | 1001 | AUG. 18, 1998   11:30:25 | File 003 |
| 4 | 1002 | AUG. 18, 1998   13:10:20 | File 004 |

FIG. 10

| USER ID | USER PASSWORD |
|---|---|
| 1001 | 12345 |
| 1002 | 56789 |

FIG. 11

METHOD FOR STORING IMAGE OF ORIGINAL AND IMAGE PROCESSING APPARATUS

BACKGROUND OF THE INVENTION

This invention relates to an image processing system which includes a digital copying machine having a scanner function and a plurality of personal computers connected to a local network and in which the scanner function of the digital copying machine is commonly utilized by the personal computers, for example.

Conventionally, it is considered that a large-sized scanner is connected to a network and utilized by a plurality of personal computers (PC) of users. In this case, the scanner is provided with the interface for the network and connected to the LAN (Local Area Network).

Further, the PC which utilizes an image read is also provided with the interface for the network and connected to the LAN.

An image read by the scanner is transmitted to the PC via the LAN. Further, it is considered that the scanner can also be commonly utilized by a plurality of PCs in such a case.

The scanner commonly utilized by a plurality of PCs transmits an image to the PC via the LAN. In a case where the scanner is utilized by a plurality of PCs, the installation place of the scanner may be far apart from the installation place of the PC in some cases. In this case, the user takes the original to the scanner, scans the original and comes back to the PC to check or confirm the scanned image.

At this time, if the image is lightly read and difficult to read or densely (darkly) read and thus the reading condition is not satisfied, it is necessary for the user to carry the original to the scanner again and scan the original again. Further, at this time, image data flows on the LAN and the traffic of the LAN (the data amount on the network) becomes heavier.

Therefore, it is required to permit the user to instantly confirm the image read by the scanner without increasing the traffic on the LAN. Further, it is required to permit the user to easily set the original when the read original is scanned again.

Thus, in the prior art, there occurs a problem that an image read by the common scanner cannot be instantly confirmed or the read image cannot be easily revised or corrected.

BRIEF SUMMARY OF THE INVENTION

An object of this invention is to provide an image processing apparatus capable of permitting the user to confirm a read image on the spot where the reading operation is effected and making clear a portion of the read image which the user wants to confirm when images of a plurality of originals are read in each document unit.

Another object of this invention is to provide an image processing apparatus including at least one image outputting device and an image inputting device commonly utilized by the image outputting devices which are connected via a network and capable of permitting an image input by the image inputting device to be instantly confirmed and permitting a read image to be easily corrected.

The above object can be attained by a method for storing of original comprising a reading step of sequentially feeding a plurality of originals in each document unit and reading images of the originals; a storing step of storing the images read in the reading step; an output step of outputting the images read in the reading step; a setting step of setting a rereading process by the reading step based on the output of the output step; a selecting step of selecting the original to be reread by the setting step; a processing step of sequentially feeding the plurality of originals read by the reading step again by the reading step and rereading the images of the originals selected by the selecting step; and a replacing step of replacing a corresponding image of the originals stored by the storing step with an images of the originals reread by the processing step.

Further, the above object can be attained by an image processing apparatus comprising reading means for sequentially feeding a plurality of originals in each document unit and reading images of the originals; storing means for storing the images read by the reading means; display means for displaying the images read by the reading means; setting means for setting a rereading process by the reading means based on the display of the display means; selecting means for selecting an original to be reread by the setting means; processing means for sequentially feeding the plurality of originals read by the reading means again by use of the reading means and rereading the images of the originals selected by the selecting means; and replacing means for replacing a corresponding images of the originals stored by the storing means with an images of the originals reread by the processing means.

The above object can be attained by an image processing apparatus comprising reading means for sequentially feeding a plurality of originals in each document unit and reading images of the originals; storing means for storing the images of the originals read by the reading means; printing means for reducing a plurality of images read by the reading means to print the reduced images on a printing medium for confirmation, printing a description frame for specifying a rereading process and a description frame specifying change of a rereading parameters for each reduced image on the printing medium for confirmation, and printing information indicating the printing medium for confirmation; determining means for determining specification of a rereading process and specification of change of the rereading parameters for each image according to the contents of the description frame for specifying the rereading process and the description frame for specifying the parameters at the rereading time which are attached to each reduced image when the printing medium for confirmation is read by the reading means and it is determined that the printing medium for confirmation is read according to the information indicating the printing medium for confirmation based on the thus read image of the printing medium for confirmation; and processing means for causing the reading means to selectively read images of the originals corresponding to the images for which specification of the rereading process is determined by the determining means while changing the parameters at the reading time according to specification of change of the rereading parameters determined by the determining means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate rate presently preferred embodiments of the invention, and together with the general description given above and the detailed description of the preferred embodiments given below, serve to explain the principles of the invention.

FIGS. 4A to 4D are views showing examples of prints obtained by printing the examples of originals of FIGS. 3A to 3C in various printing forms;

FIG. 10 is a diagram showing one example of an image management table for managing an image read by a scanner section of the digital copying machine;

FIG. 11 is a diagram showing one example of a user management table for managing the user on the digital copying machine;

DETAILED DESCRIPTION OF THE INVENTION

There will now be described embodiments of this invention with reference to the accompanying drawings.

Figure 1:
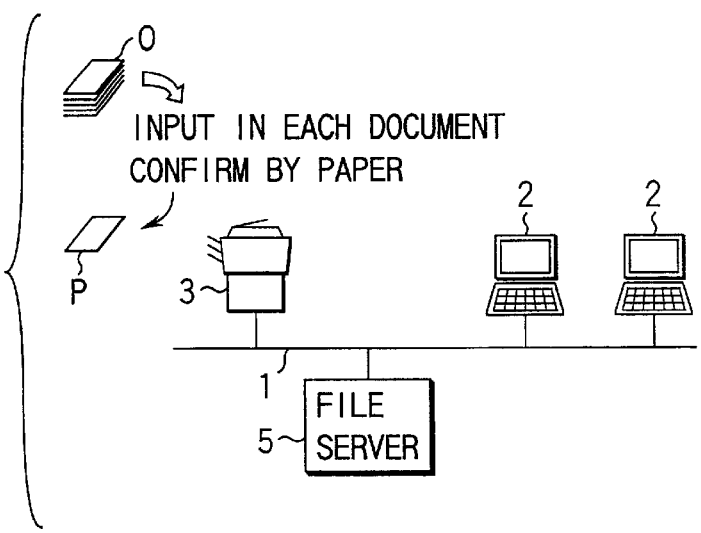
FIG. 1 is a block diagram showing the schematic construction of an image processing system.

FIG. 1 shows the schematic construction of an image processing system of this invention.

That is, as shown in FIG. 1, the image processing system includes a plurality of personal computers (PC, client PC, image outputting device) 2 which the users can independently use, a digital copying machine 3 having a high-speed image reading function (scanner function, image inputting device) and commonly used by a plurality of users and a file server 4 for storing various data items on a local network (LAN).

The PC 2 receives and utilizes an original image read by use of the scanner function of the digital copying machine 3 and the scanner function of the digital copying machine 3 is commonly used by the PCs 2.

Further, printing information items from the PCs 2 are transmitted to the digital copying machine 3 via the LAN 1 and printed by the digital copying machine 3.

The PC 2 has a keyboard and mouse as an input section and a display section.

The schematic construction of the digital copying machine 3 is explained with reference to FIG. 2.

The digital copying machine 3 feeds an image signal of an original read by a scanner section (scanner function, image reading section) 11 to a printer section (printing section) 12 and prints the image signal when it is used as a general copying machine. For this purpose, the scanner section 11 is provided with a CCD sensor to scan the original and convert light into an electrical signal. The scanner section 11 has an automatic original (document) feeder (ADF) 11a as original feeding means for sequentially feeding originals O set in each document unit and including a plurality of originals for each sheet. The originals O of plural pages are sequentially fed for each sheet and automatically read by setting the originals of plural pages in each document unit on the original table of the ADF 11a.

The printer section 12 is a printing device utilizing an electrophotographic system in this embodiment. When receiving an electrical signal of the image, the printer section 12 prints the image on printing paper P used as an image forming medium. As the printer section 12, an ink jet type printer section may be used instead of the electrophotographic printer.

The printer section 12 prints an image read by the scanner section 11 or an image synthesized by an image reducing/synthesizing section 20 as will be described later on the paper P.

The digital copying machine 3 includes a control section 17 having a CPU (Central Processing Unit) 13 for controlling the operation of the digital copying machine 3, a ROM (Read Only Memory) 14 storing a software for executing the operation of the digital copying machine 3, a RAM (Random Access Memory) 15 for temporarily storing image data and other data items associated with the operation, a hard disk device (HDD) 16 for temporarily storing various data items and the like.

In the first embodiment, the HDD 16 includes a rereading management table (storage means) 16a for managing a read image and an image which is reread.

To the control section 17, the scanner section 11, printer section 12, an image storing section (storage section) 18 for storing an image read by the scanner section 11, a control panel (instruction means, informing means) 19 used as a display input section having a touch panel by means of which various instructions by the user are input and which displays the guidance of the operation for the user, the image reducing/synthesizing section 20 for reducing a plurality of images read and synthesizing the reduced images, extracting preset portions and synthesizing the extracted portions, and a communicating section 21 connected to the LAN 1, for performing communication with devices connected to the LAN 1 are connected.

The image storing section 18 is provided in the hard disk device (HDD) 16. However, the image storing section 18 may be provided in a position different from the hard disk device (HDD) 16.

As the control panel 19, an operation panel including hard keys such as ten keys and a display section having a touch panel (not shown) contained therein is used and instructions such as setting of various items and various operations are input by operating the touch panel or hard keys and the guidance of the operation and information of error contents at the time of occurrence of an error may be displayed.

The image reducing/synthesizing section 20 effects the image reducing, extracting and synthesizing process to create a printing image in order to permit the user to check or confirm the image read by the scanner section 11 and print the same in a printing form specified by the user.

Figure 2:
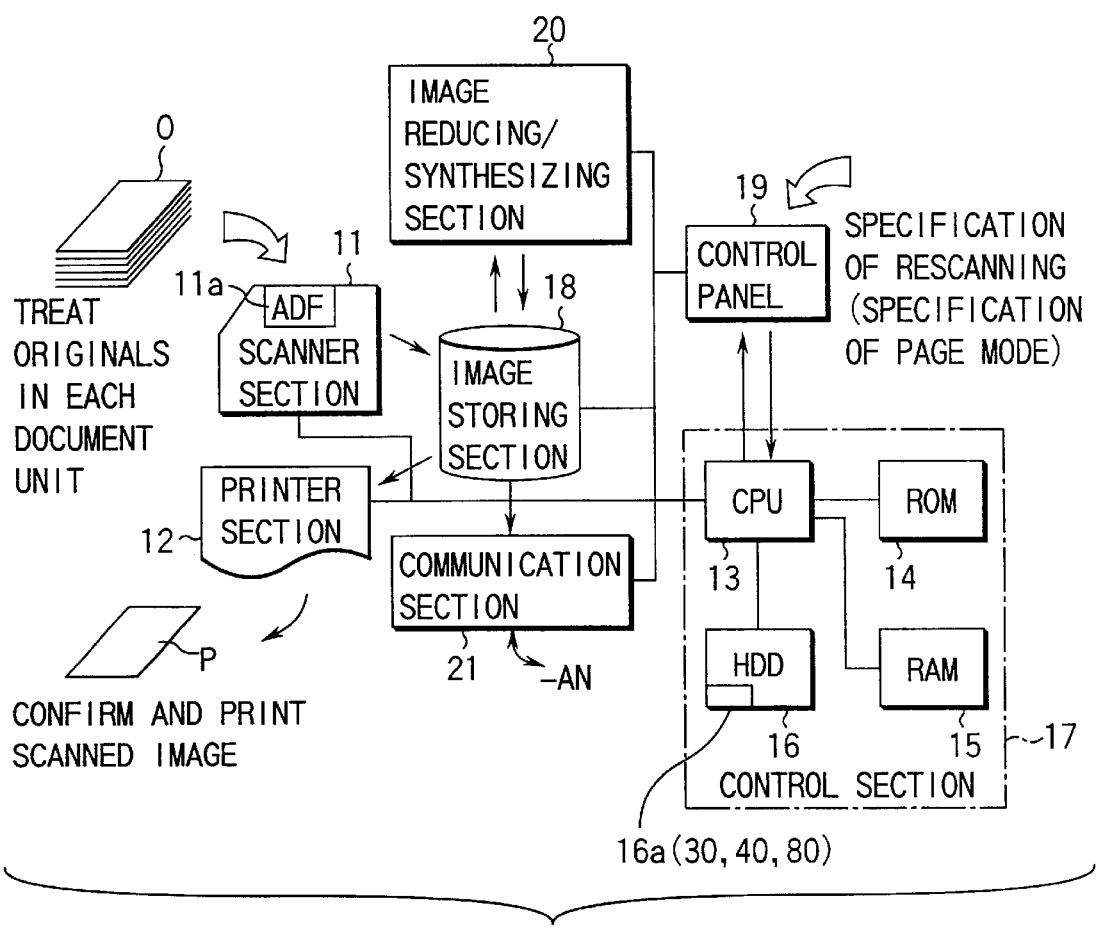
FIG. 2 is a block diagram showing the schematic construction of a digital copying machine.

In the above embodiment, a case wherein various constituents shown in FIG. 2 are mounted on one digital copying machine 3 is explained, but this invention is not limited to the above case and the scanner section 11 and the printer section 12 can be provided on any desired devices connected to the LAN 1 if the scanner section 11 and printer section 12 are provided as different devices and the installation positions thereof are close to each other. For example, only the image reducing/synthesizing section 20 may be mounted on the file server 4 or the image storing section 18 and image reducing/synthesizing section 20 may be mounted on the file server 4.

In the image processing system used in the above environment, an image read by the scanner section 11 is read out from the image storing section 18 and finally transmitted to the PC 2 side connected to the LAN 1 via the communicating section 21 and thus the read image can be provided for each user.

Further, the user using the image processing system in the above environment carries originals O to the digital copying machine 3, instructs and executes reading of the originals O. Then, he (user) confirms the read image or the result of reading on the spot according to the printing result printed in a desired one of various printing forms as will be described later and instructs a page to be next read.

As a result, the user who went to the digital copying machine 3 with the originals O can positively complete the image reading operation including the process for confirming the read image on the spot and it becomes unnecessary for the user to walk along between the digital copying machine 3 and the PC 2 depending on the image reading state.

Next, the printing form set when the read image is printed in order to permit the user to check or confirm the read image is explained in detail with reference to FIGS. 3A to 3C and FIGS. 4A to 4D.

The printing form used for confirming the read image is selected from a full-size object copying form set when a read image on one sheet of printing paper P is printed for each page, a reducing/synthesizing form set when the whole pages of read images are reduced for each page and the reduced images are printed on one sheet of printing paper P for every preset number of pages, a central portion extracting/synthesizing form set when the central portions of all of the read pages are uniformly extracted and the extracted images are printed on one sheet of printing paper P for every preset number of pages, a lower portion extracting/synthesizing form set when the lower portions of all of the read pages are uniformly extracted and the extracted images are printed on one sheet of printing paper P for every preset number of pages, and an upper portion extracting/synthesizing form set when the upper portions of all of the read pages are uniformly extracted and the extracted images are printed on one sheet of printing paper P for every preset number of pages.

The full-size object copying form is a form in which the original images of a plurality of pages read are respectively printed on sheets of printing paper of the same size as the original at magnification of X1.

The reducing/synthesizing form is a form in which, for example, the original images of plural pages read are reduced to one-fourth, one-ninth or one-sixteenth of the original size for each page and an image obtained by respectively synthesizing every four pages (4 in 1), every nine pages or every sixteen pages is printed on one sheet of printing paper.

The central portion extracting/synthesizing form is a form in which, for example, a one-fourth portion, one-ninth portion or one-sixteenth portion of a read image having the central portion of each page arranged at the center thereof is extracted from each of the original images of plural pages read and an image obtained by respectively synthesizing the extracted images of four pages, nine pages or sixteen pages is printed on one sheet of printing paper.

The lower portion extracting/synthesizing form is a form in which, for example, a one-fourth portion, one-ninth portion or one-sixteenth portion of a read image having the central portion of the lower portion of each page arranged at the center thereof is extracted from each of the original images of plural pages read and an image obtained by respectively synthesizing the extracted images of four pages, nine pages or sixteen pages is printed on one sheet of printing paper.

The upper portion extracting/synthesizing form is a form in which, for example, an upper one-fourth portion, one-ninth portion or one-sixteenth portion of each page is extracted from each of the original images of plural pages read and an image obtained by respectively synthesizing the extracted images of four pages, nine pages or sixteen pages is printed on one sheet of printing paper.

Figure 3A:
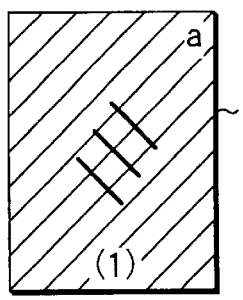
FIGS. 3A to 3C are views showing examples of originals in each document unit.
Figure 3B:
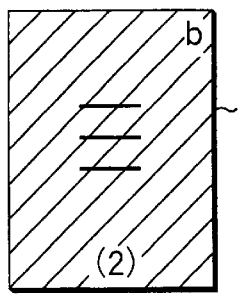
Figure 3C:
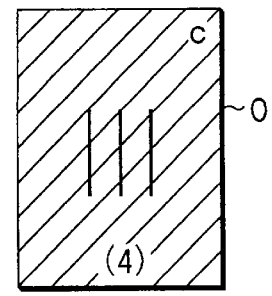

FIGS. 4A to 4D are views showing concrete examples of the printing forms for confirmation of the read images when the originals shown in FIGS. 3A to 3C are read. In this case, as shown in FIGS. 3A to 3C, a case wherein a document including originals O of three pages is read is explained.

That is, when the user selects the full-size object copying form, the digital copying machine 3 prints images of the same image size as the read image with respective pages attached to the read images for all of the pages.

When the user selects the reducing/synthesizing form, the digital copying machine 3 creates a synthesized image by reducing each of the whole pages to one-fourth of the original size, sequentially attaching the reduced images in an order of the upper left portion, upper right portion and lower left portion and respectively assigning pages to the read images by use of the image reducing/synthesizing section 20 and prints the synthesized image on the printing paper P by use of the printer section 12 as shown in FIG. 4A.

Further, when the user selects the central portion extracting/synthesizing form, the digital copying machine 3 creates a synthesized image by uniformly extracting a central one-fourth portion of the original image for each page, sequentially arranging the extracted images in an order of the upper left portion, upper right portion and lower left portion and respectively assigning pages to the read images and prints the synthesized image on the printing paper P by use of the printer section 12 as shown in FIG. 4B.

Further, when the user selects the lower portion extracting/synthesizing form, the digital copying machine 3 creates a synthesized image by uniformly extracting a lower central one-fourth portion of the original image for each page, sequentially arranging the extracted images in an order of the upper left portion, upper right portion and lower left portion and respectively assigning pages to the read images and prints the synthesized image on the printing paper P by use of the printer section 12 as shown in FIG. 4C.

Further, when the user selects the upper portion extracting/synthesizing form, the digital copying machine 3 creates a synthesized image by uniformly extracting an upper one-fourth portion of the original image for each page, sequentially arranging the extracted images from the upper portion and respectively assigning pages to the read images and prints the synthesized image on the printing paper P by use of the printer section 12 as shown in FIG. 4D.

As described above, in a case where the printing form is selected from the various printing forms and the read image is printed and output in order to permit the user to read a document including originals of plural pages and confirm whether the image which the user can utilize without any problem by use of the client PC is read or not on the spot, the printing forms become effective in the following respects.

That is, according to the purpose of the user to confirm the read image, the full-size object copying form for printing and outputting read images of full size for all of the pages with each page for one sheet of printing paper is effective when it is necessary to check the whole items such as the resolution, feeding of the original, concentration and crease without fail.

the reducing/synthesizing form for reducing read images of all of the pages, arranging the reduced images of four pages, nine pages or sixteen pages on one sheet of paper, for example, and printing and outputting the read images is effective when it is necessary to confirm that the whole document is read without omission of pages and crease.

the central portion extracting/synthesizing form for uniformly extracting a central one-fourth, one-ninth or one-sixteenth of the read image for all of the pages, arranging the extracted portions of four pages, nine pages or sixteen pages on one sheet and printing and outputting the arranged images is effective when it is necessary to confirm the resolution and concentration by use of the full-size sample image even if it is a partial image since significant image information is generally contained in the central portion of the original and the possibility that the central portion is a blank portion is weak.

the lower portion extracting/synthesizing form for uniformly extracting a lower central portion of the read image for all of the pages, arranging the extracted portions of plural pages on one sheet and printing and outputting the arranged images is effective to simply confirm whether or not omission of pages occurs due to failure of the original feeding by tracing the pages when the pages are allotted to the lower central portions of the originals.

the upper portion extracting/synthesizing form for uniformly extracting an upper portion of the read image for all of the pages, arranging the extracted portions of plural pages on one sheet and printing and outputting the arranged images is effective to confirm the result of reading of the image near the boundary of the readable area when it is desired to stably read and utilize the transmission/reception date and time of a FAX received original (which is normally printed on the upper portion of the paper).

The printing forms can be selected according to the purposes of the user by taking the above effective points of the respective printing forms into consideration.

Thus, it becomes possible to print the read images in a printing form which permits the user to easily check a portion of the read image and provide the read images to the user so that the user can easily find a page which is specified to be reread.

Figure 5:
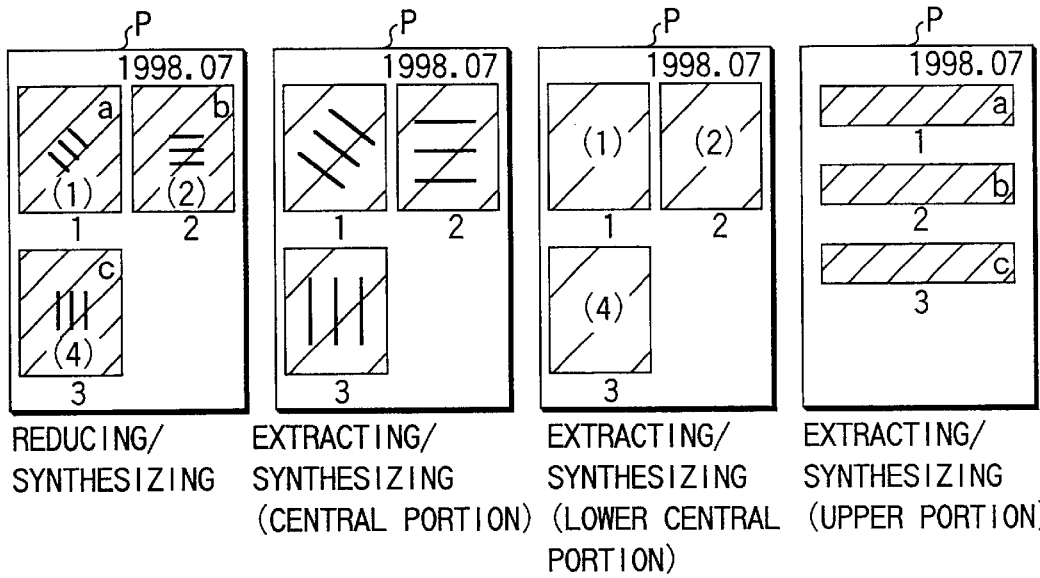
FIG. 5 is a block diagram showing an example of the construction of a reread management table.

FIG. 5 is a diagram showing one example of the rereading management table 16a.

The rereading management table 16a contains fields for storing a read mode (scan mode) including the concentration, resolution and the size of an original at the preceding (first) reading time (preceding scanning time), an image file name (which may be represented by an address) stored in the image storing section 18 after execution of the preceding reading, the total number of pages fed by the ADF 11a at the preceding reading time, the page number of a page specified as an object of rereading, a read mode for each page specified as an object of rereading (rescanning), an image file name (which may be represented by an address) stored in the image storing section 18 after rereading, and the total number of pages of originals fed by the ADF 11a at the rereading time.

Further, if the image obtained by rereading is required to be further reread, the rereading management table 16a is re-created so as to continuously perform the rereading process.

That is, the image file name and the rescan mode at the rereading time corresponding to the rescanning page number which is an object of rereading are copied into an image file name and read mode corresponding to each page at the. preceding reading time.

Further, the whole pages of the originals O fed by the ADF 11a at the rereading time are copied into the field of the whole pages of the originals O fed by the ADF 11a at the preceding reading time. Then, in order for preparation for the next rereading process, the contents of the respective fields at the rereading time are cleared.

Thus, the rereading process can be repeatedly specified by the operation for reading the originals in each document unit without any complicated troublesome.

Figure 6:
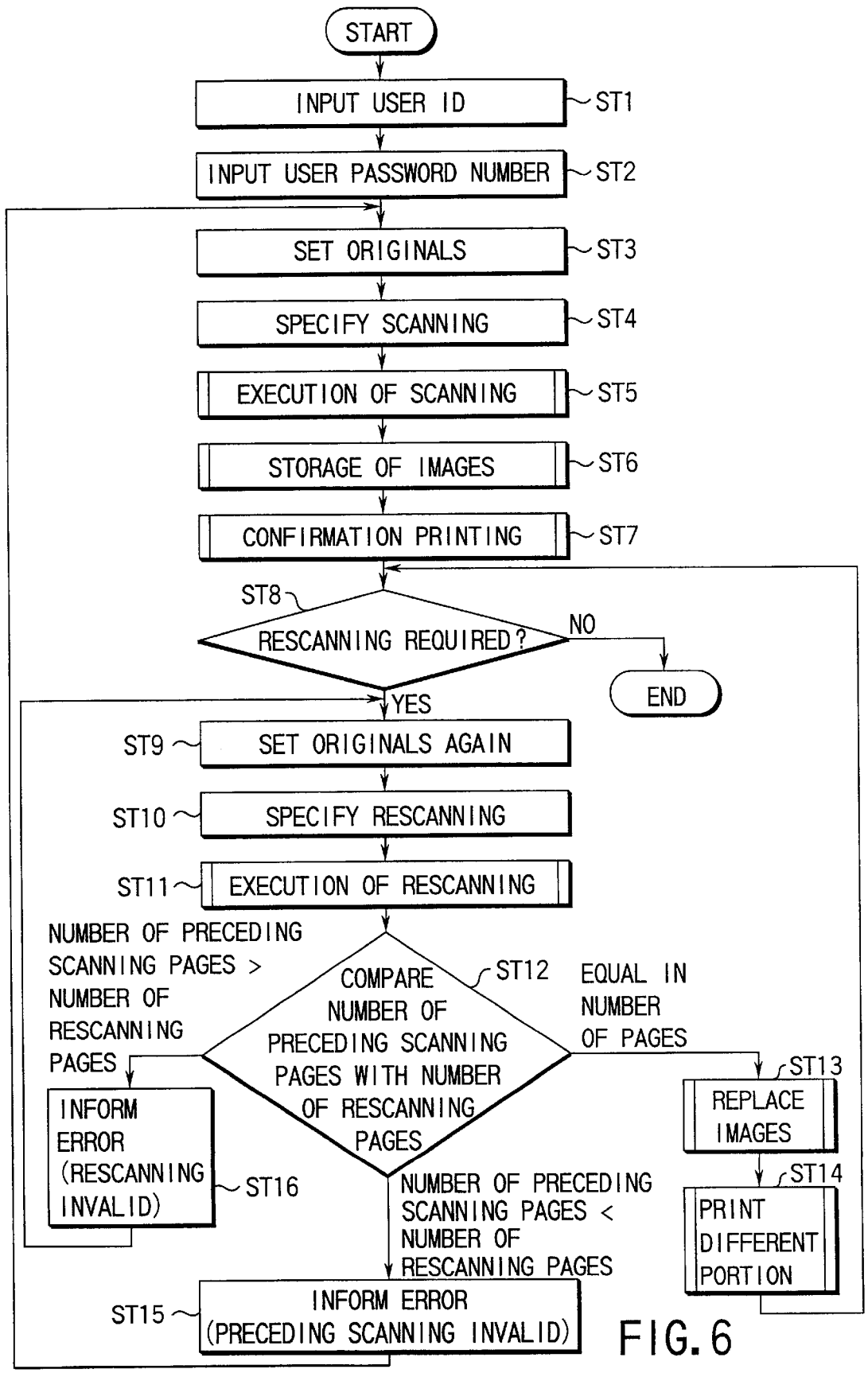
FIG. 6 is a flowchart for illustrating the reading process for reading the originals in each document unit in the image processing system.

Next, the reading process for reading original images in each document unit including originals O of plural pages is explained with reference to the flowchart shown in FIG. 6.

First, the user goes to the digital copying machine 3 and inputs a user ID and user password number assigned to the user by use of the control panel 19 so as to specify or confirm the user (steps ST1, ST2). Then, if the user is confirmed, the user sets the document including originals of plural pages on the ADF 11a (step ST3) and sets the read mode of the original by use of the control panel 19 to specify the reading process (step ST4). Then, the control section 17 starts the process for reading the original.

If the reading process for reading the originals O is specified by the user, the control section 17 executes the process (scan process) for reading the images of the originals O sequentially fed for each sheet by the ADF 11a by use of the scanner section 11 according to the contents of the instruction of the reading mode or the like made by the control panel 19 (step ST5). At this time, the control section 17 stores the images sequentially read by the scanner section 11 into the image storing section 18 (step ST6).

If reading of the originals O placed on the ADF 11a is completed and storage of the read images into the image storing section 18 is completed, the control section 17 attaches a page of the original (image number) to each image stored in the image storing section 18 by the confirmation printing process which will be explained later, effects the image processing for reducing and synthesizing the images, for example, and prints the thus processed images (step ST7).

In this case, the printing form of the read image to be printed is selected from the above-described various printing forms by the user according to the purpose of the user to confirm the read image. The user confirms the read image by observing the printing result for confirmation printed by the digital copying machine 3 which has read the original image.

As the result of confirmation, if it is detected that all of the read images are satisfied by the user and it is not necessary to reread any page of the original O (step ST8), the user terminates the reading process for the originals O by specifying the end of reading by use of the control panel 19.

Further, as the result of confirmation, if it is detected that all of the read images are not satisfied by the user and it is necessary to reread at least one page of the original (step ST8), the user sets the originals of the document unit on the ADF 11a (step ST9), inputs a page number required to be reread and a read mode corresponding to the page by use of the control panel 19 and then specifies the rereading process for rereading the original O (step ST10).

At this time, the rescanning page number of the original which is specified to be reread by the user is stored in and managed by the rereading management table 16a together with the read mode such as the resolution, size of the original and concentration set for each rescanning page by the user.

If the rereading process is specified by the user, the control section 17 causes the originals to be fed from the ADF 11a for each sheet, refers to the contents of the rereading management table 16a and effects the rereading (rescanning) process only for the page which is specified to be reread by the user (step ST11).

Then, if the control section 17 feeds all of the pages of the originals, it stores the total number of pages of the originals O fed at the rereading time into the rereading management table 16a. The control section 17 compares the total number of pages of the originals fed at the rereading (rescanning) time with the total number of pages of the originals fed at the preceding reading (preceding scanning) time and determines whether or not the total numbers of pages coincide with each other (step ST12).

If it is detected as the result of above determination that the total numbers of pages coincide with each other, the control section 17 determines that at least the original feeding (sheet feed) operation by the ADF 11a is effective at the time of execution of two successive image reading processes. Then, the image read as the result of the rereading process is used instead of the image stored in the image storing section 18 as the result of the preceding reading process (step ST13).

The control section 17 effects the different portion printing process for printing only the newly replaced read image or images (step ST14). The user checks the reread image based on the printing result and if the reread image is not satisfied, he further effects the rereading process and if it is satisfied, he terminates the process (step ST8).

If it is determined in the step ST12 that the number of pages at the preceding reading time (the number of pages fed by the ADF 11a) and the number of pages at the rereading time (the number of pages fed by the ADF 11a) do not coincide with each other, the control section determines that an error may occur in the sheet feed (original feeding) operation by the ADF 11a at the time of execution of two successive image reading processes and informs the error by use of the control panel 19.

That is, if the control section 17 determines that the number of pages at the time of preceding scanning and the number of pages at the time of rescanning do not coincide with each other and the number of pages at the time of rescanning is larger, it determines that the possibility that a problem occurs in the sheet feed operation by the ADF 11a at the time of preceding reading is strong. Based on the above determination, the control section 17 displays that the preceding scanning process has not been correctly effected and the original reading process should be effected from the beginning on the display screen of the control panel 19 as a guide, makes the read image read at the preceding reading time invalid and returns the process to the step ST3 (step ST15).

Further, the control section 17 determines that the possibility that an error has occurred in the sheet feed (original feeding) operation by the ADF 11a at the rereading time is strong if the number of pages at the time of preceding scanning is larger. Based on the above determination, the control section 17 displays that the rereading process has not been correctly effected and the rereading process should be effected again on the display screen of the control panel 19 as a guide, makes the read image read at the rereading time invalid and returns the process to the step ST9 (step ST16).

As described above, the originals are fed for each sheet in each document unit by the ADF to read the images of the originals and the thus read images in each document unit are assigned with image numbers for each page and printed in the printing form selected by the user from the full-size object copying form, reducing/synthesizing form, upper portion extracting/synthesizing form, central portion extracting/synthesizing form and lower portion extracting/synthesizing form.

As a result, a plurality of images of the originals read in each document unit can be effectively checked according to the purpose of the user on the spot where the reading operation is effected.

Further, in a case where the operation for reading the originals in each document unit having a plurality of pages is repeatedly effected until the read images which satisfy the user can be obtained, only the page or pages specified to be reread among the originals set again on the ADF in each document unit are reread.

As a result, it is not necessary to extract only the page which is required to be rescanned from a sheaf of originals, the originals can be treated in each document unit, only the page which is required to be reread can be read, the reading process for unnecessary pages is not effected and the processing time and the storage capacity required for the processing can be suppressed to minimum to omit the wasteful process.

Further, in a case where the operation for reading the originals in each document unit having a plurality of pages is repeatedly effected until the read images which satisfy the user can be obtained, only the page or pages specified to be reread among the originals set again on the ADF in each document unit are reread and only the reread image is printed for confirmation.

As a result, unnecessary prints can be prevented from being output and only the reread images which the user wants to check can be efficiently confirmed.

Further, in a case where the operation for reading the originals in each document unit having a plurality of pages is repeatedly effected until the read images which satisfy the user can be obtained, the number of pages at the reading time in the preceding cycle is compared with the number of pages at the reading time in the next cycle and if the compared numbers of pages do not coincide with each other, it is determined that the process in which the number of pages is determined to be smaller is not correct, the read images obtained in the process in which the number of pages is determined to be smaller-are made invalid and information indicating to this effect is notified to the user.

As a result, the rereading operation can be stably repeatedly effected without causing any troublesome operation in a case where the operation for reading the originals in each document unit is repeatedly effected until the read images which satisfy the user can be obtained, and an influence by failure in the original feeding process which may cause shifting of pages to be read can be suppressed to minimum and wasteful paper printing due to the shifting of pages can be prevented.

Figure 7:
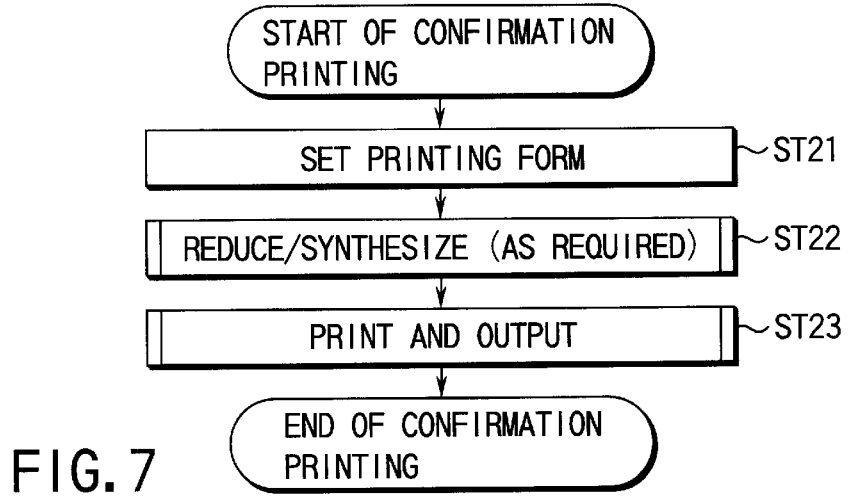
FIG. 7 is a flowchart for illustrating the confirmation printing process.

Next, the confirmation printing process in the step ST7 is explained in detail with reference to the flowchart shown in FIG. 7.

First, the user specifies the printing form to check the read image by use of the control panel 19 when the process for reading all of the pages of the originals O is completed. At this time, the user selects the printing form by taking the purpose of application of the read image and the item to be checked into consideration. Selection of the printing form by the user may be specified at the starting time of reading the originals O.

If the user selects the printing form, the control section 17 internally sets the printing form selected from some choices (step ST21). The control section 17 allots pages of the originals (image numbers) to the images read by the image reducing/synthesizing section 20 according to the set printing form and effects the image reducing, enlarging or synthesizing process (step ST22). Then, the control section 17 temporarily stores the reduced/synthesized image into the image storing section 18 and causes the printer section 12 to print and output the image (step ST23).

Figure 8:
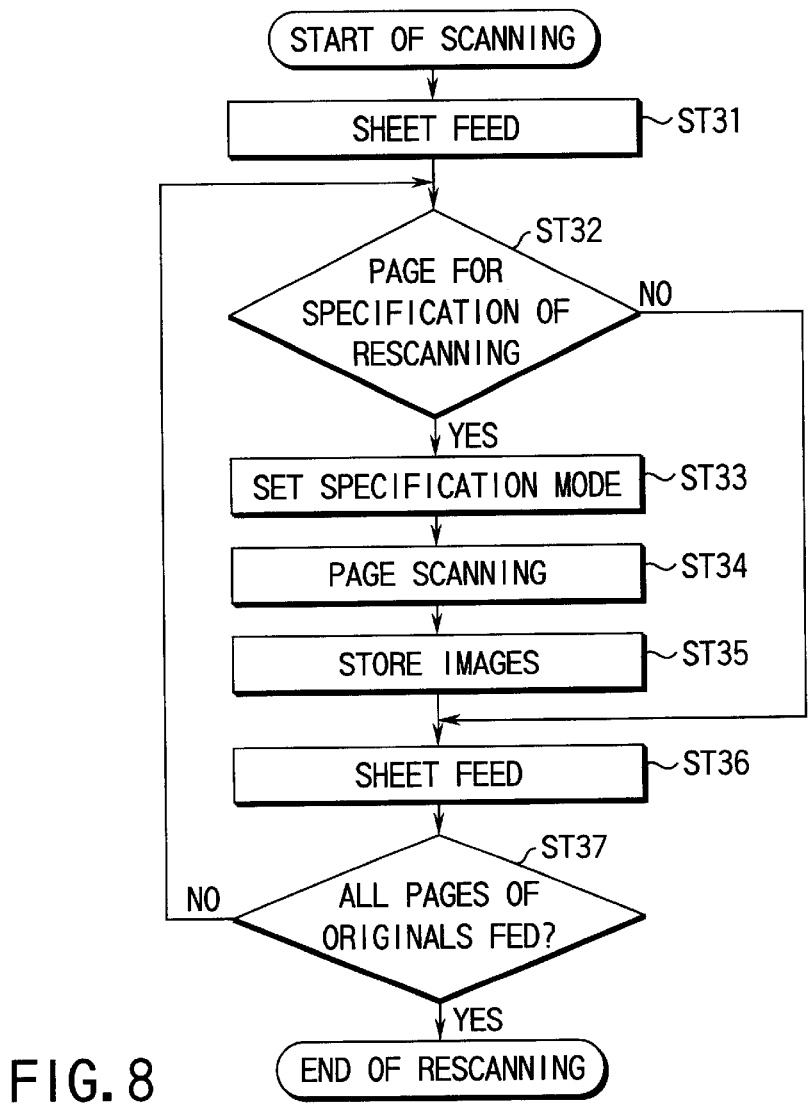
FIG. 8 is a flowchart for illustrating the rescanning process.

Next, the rereading (rescanning) process in the step ST11 is explained in detail with reference to the flowchart shown in FIG. 8.

If the user specifies the rereading process, the control section 17 starts the rereading process. At this time, the user sets the originals O to be subjected to the reading process in each document unit on the ADF 11a and instructs the page number to be reread among the originals in each document unit and the read mode corresponding to the page number by use of the control panel 19.

The control section 17 feeds the originals on the ADF 11a for each sheet (step ST31) and counts the pages. Then, the control section 17 determines whether the page which is now counted is the page to be reread or not by referring to the rereading management table 16a (step ST32).

If it is determined by the above determination that the sheet feeding count coincides with the page which is specified to be reread, the read mode corresponding to the page which is specified by the user is set by referring to the rereading management table 16a (step ST33). Then, the image of the original O in the set read mode is read (step ST34) and the read image is stored into the image storing section 18 (step ST35). If the reading process for the page of the original is completed, a next original O is fed by the ADF 11a (step ST36).

If it is determined in the step ST32 that the page now counted is not the page to be reread, a next original O is fed by the ADF 11a (step ST36).

The control section 17 checks whether or not the page of the original O fed is the last page of the document according to the count of the original O fed each time the original O is fed (step ST37). If it is determined as the result of above determination that the count of the original does not indicate the last page, the process is returned to the step ST32 and the process for a next page is effected in the same manner as described above. If it is determined that the count of the original corresponds to the last page, the control section 17 reads and stores the total number of pages of all of the originals fed into the rereading management table 16a and terminates the rereading process.

Figure 9:
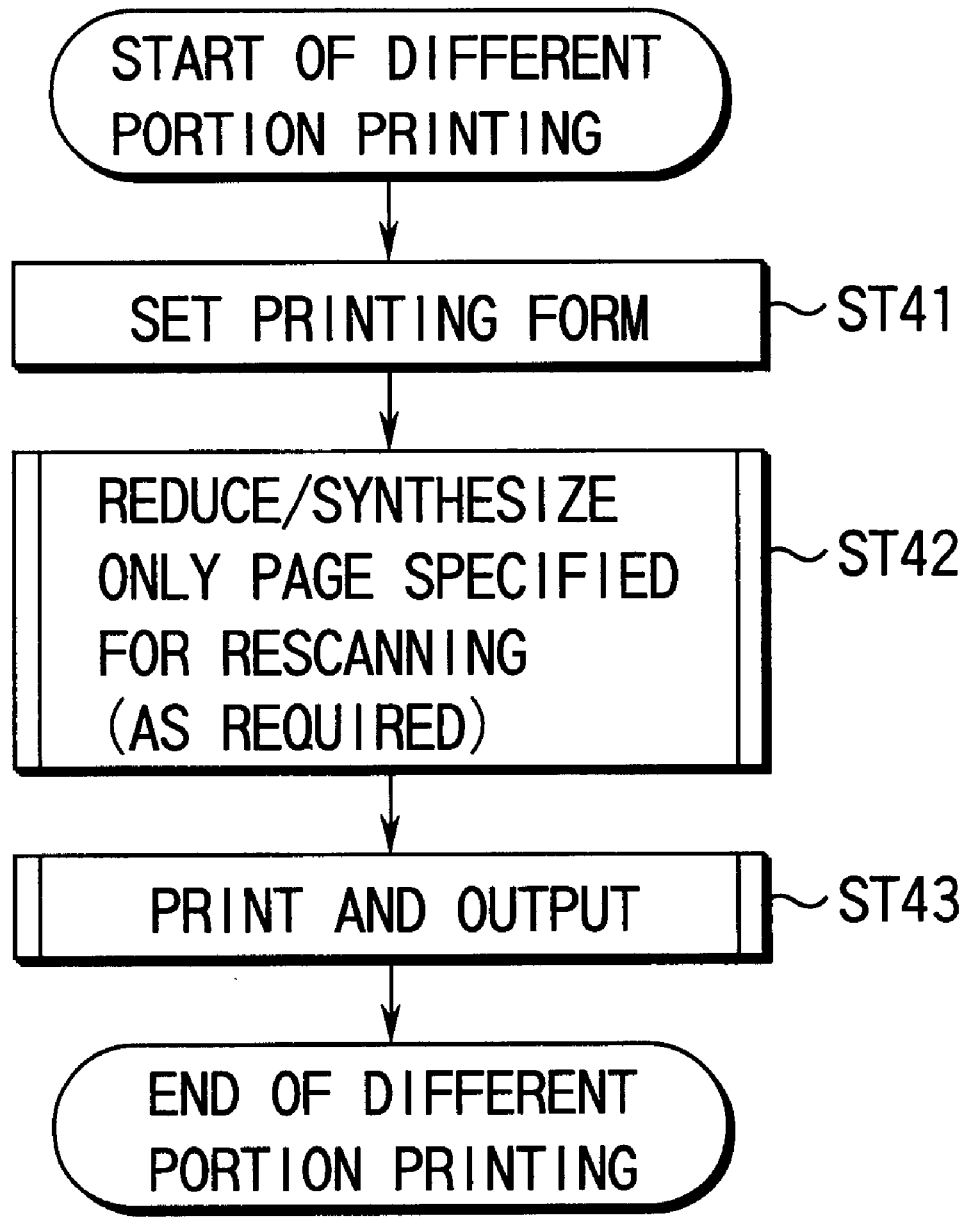
FIG. 9 is a flowchart for illustrating the different portion printing process.

Next, the printing process for the image read in the rereading process is explained in detail with reference to the flowchart shown in FIG. 9.

First, if the rereading process for the originals O in each document unit is completed, the user specifies the printing form used for checking the image reread by use of the control panel 19. At this time, the user selects the printing form by taking the purpose of application of the read image and the item to be checked into consideration. The printing form for the reread image may be specified by the user at the starting time of the rereading process or the printing form specified by the user at the original reading time in the preceding cycle may be used.

Then, if the printing form for the reread image is selected by the user, the control section 17 internally sets the printing form selected from some choices (step ST41). The control section 17 treats only the reread image as an object, allots a page of the original (image number) to each image by use of the image reducing/synthesizing section 20 according to the set printing form and effects the image reducing, enlarging or synthesizing process (step ST42). Then, the control section 17 temporarily stores the reduced/synthesized image into the image storing section 18 and effects the different portion printing process by causing the printer section 12 to print and output the image (step ST43).

As described above, when only the page specified to be reread is reread according to the specification of the page to be reread by the user after the originals in each document unit are read, only the read image of the page which has been reread is printed in the selected printing form.

As a result, the user can efficiently check only the reread image of the page which has been reread based on the printing result in the printing form which is suitable for the item to be checked.

If document images including plural pages are read in the image processing system using a device connected to the LAN and commonly used by a plurality of users, the read image can be checked on the spot where the reading operation is effected and a portion of the read image which the user wants to check can be made clear.

Further, in the first embodiment, a case wherein the originals in each document unit are fed for each sheet by the ADF to read the images of the originals in the digital copying machine connected to the LAN, the read images of each document unit are printed for each page in the printing form selected by the user and the user can efficiently check a plurality of original images read in each document unit according to the purpose of the user on the spot where the reading operation is effected is explained, but this invention is not limited to this case. For example, as a second embodiment, it is possible to issue a confirmation sheet on which the read images are reduced and printed when the document images are read and input by the scanner section of the digital copying machine, describe specifications of rereading for each image, change of concentration and change of resolution (rereading condition) on the confirmation sheet according to the result of confirmation of the issued confirmation sheet, first determine the original to be reread and changes of the concentration and resolution of a reading image based on the contents of the confirmation sheet by placing the confirmation sheet and the originals of a corresponding document on the scanner section and reading the originals, and selectively reread the document image with the corresponding concentration and resolution by the scanner section according to the result of above determination.

The second embodiment is explained with reference to the accompanying drawings. The construction of the second embodiment is the same as that of the first embodiment shown in FIG. 2.

However, an image management table 30, user management table 40 and sheet ID management table 80 are used instead of the rereading management table 16*a*.

A case wherein the image of an original O is read by the digital copying machine 3 and used by PCs 2 is explained.

A scanner section 11 is provided with the ADF 11*a*. The originals (document) D of plural pages are placed on the original table of the ADF 11*a* and then sequentially and automatically read for each sheet. The images of the read originals O are stored into an image storing section 18 of an HDD 16 as a file in each document unit. At the inputting time (at the time of reading and storage of the original image), a user ID for specifying the user is input from a control panel 19 of the digital copying machine 3 and an image stored for permitting the user to access from the PC2 later is managed.

When the original O becomes no more present on the ADF 11*a*, a sheet for confirmation (confirmation sheet 50 which will be described later) of the input images of the originals O is printed by a printer section 12. On one confirmation sheet, the input images of the originals O of plural pages are printed in a reduced form.

By observing the confirmation sheet 50, it is possible to determine whether or not the images of the originals O are satisfactorily read, the concentration is high or low (dark or light), the reading density is inadequate, and only one page of the originals O is input in the skewed and inclined state.

In the above cases, revise or correction can be made by directly making corrections on the confirmation sheet 50, attaching the confirmation sheet 50 to the head portion of the original O and rereading the originals O.

Next, an example of the image management table 30 for managing the image read by the scanner section 11 of the digital copying machine 3 is explained.

FIG. 10 shows the image management table 30. The image management table 30 includes a job ID field 31, user ID field 32, registration date and time field 33 and pointer-to-image field 34. The image management table 30 is stored in the HDD 16.

A serial number is issued for arrangement each time a sheaf (document) of originals O is read and stored into the job ID field 31. A user ID (which is input at the time of inputting of the original image) is stored in the user ID field 32 so as to determine a user to whom the job belongs. The date and time at which the originals O are read are stored in the registration date and time field 33. Data indicating a file of read images is stored in the pointer-to-image field 34.

If the image is used by the PC 2 and the job becomes unnecessary, the job is deleted from the image management table 30. An example wherein four jobs are registered in the image management table 30 shown in FIG. 10 is indicated.

In the job management, the owner of the job is managed. The user is managed by scanning the original O by use of the digital copying machine 3 so as to prevent the other user from using the image by use of the PC 2. That is, only the image obtained by scanning the original O by himself by use of the scanner section 11 of the digital copying machine 3 can be used from the PC 2. For this purpose, the user ID and password are input by use of the control panel 19 at the time of inputting of the original O in the digital copying machine 3. At this time, coincidence of the user ID and password is confirmed.

The user management table 40 which stores the user ID and password is shown in FIG. 11. The user management table 40 is stored in the HDD 16. The user management table 40 has a user ID field 41 and user password field 42.

Next, an example of the confirmation sheet 50 on which an image obtained by reading the originals O by the scanner section 11 of the digital copying machine 3 is printed is explained. In this example, the originals O are read by the digital copying machine 3 connected to the LAN 1 and used by the PC 2, but in a case where the installation place of the digital copying machine 3 and the installation place of the PCs 2 are separated apart from each other, it is necessary for the user to go to the digital copying machine 3 again if the user goes back to the PC 2 after reading, confirms the read image and determines that the reading process is not satisfactorily effected and the rereading process must be effected. In order to eliminate the troublesome operation, it is desirable to confirm the input image immediately after the originals O are read by the digital copying machine 3 and easily re-input the original image if the read images are not satisfied and therefore the confirmation sheet 50 is printed.

Figure 12:
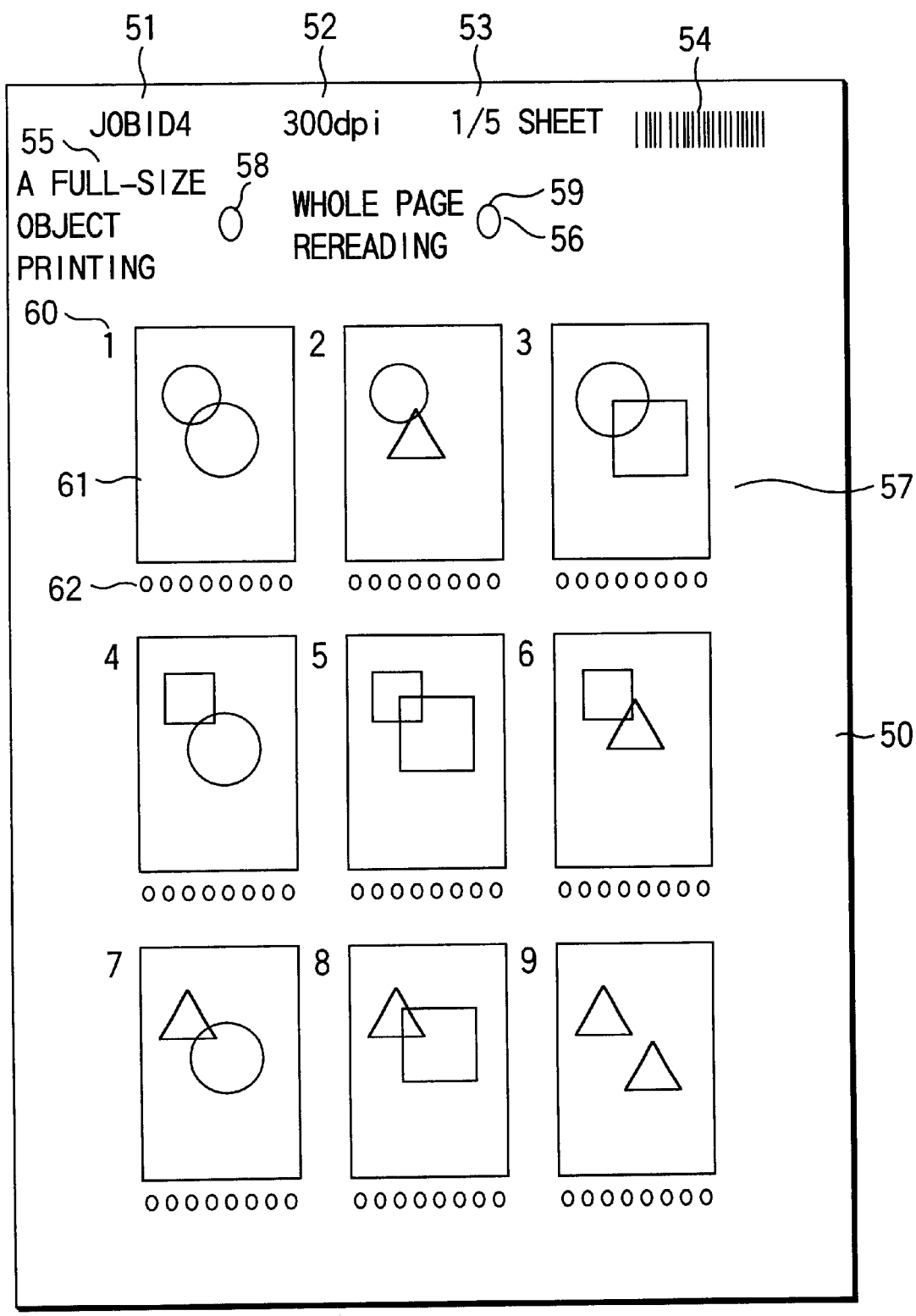
FIG. 12 is a view showing one example of a confirmation sheet to be printed by the digital copying machine.

An example of the confirmation sheet 50 is shown in FIG. 12. The confirmation sheet 50 has a job ID display area 51, reading density display area 52, page number area 53, bar code display area 54 indicating the sheet ID, full-size object printing specifying area 55, whole page rereading specifying area 56 and image display area 57.

The job ID display area 51 displays a job number of a displayed image. The reading density display area 52 displays the density at the time of reading of the originals O. The page number area 53 displays the total number of pages of the confirmation sheets 50 and the page of the confirmation sheet 50. In the case of FIG. 12, nine images are printed on one confirmation sheet 50, but if the total number of originals is larger than nine and the confirmation sheets 50 of plural pages are used, the page of the corresponding confirmation sheet 50 is displayed. The bar code display area 54 displays a sheet ID of serial number attached to each confirmation sheet 50 as a bar code. The sheet ID is attached to each confirmation sheet 50. The full-size object printing specifying area 55 has a check area 58. The whole page rereading specifying area 56 has a check area 59.

In this example, nine images are printed on the image display area 57. Each of the images has an image page 60, image 61 and specification check area 62. Only part of the image on the image display area 57 is extracted and shown in FIG. 13. The image page 60 indicates the page of the image in the originals (document) D. In the image 61, the image read by the scanner section 11 is printed. The check area 62 is a portion which is selectively painted out according to the mark sheet method to make specification. The check area 62 has a rereading area 63 for specifying the rereading process in the same condition, density specifying (rereading condition) area 64 and concentration specifying (rereading condition) area 65. The density specifying area 64 has a 600 dpi specifying check area 66, 400 dpi specifying check area 67 and 200 dpi specifying check area 68. The concentration specifying area 65 has a check area 69 for reading the image with the concentration higher by two stages, a check area 70 for reading the image with the concentration higher by one stage, a check area 71 for reading the image with the concentration lower by one stage and a check area 72 for reading the image with the concentration lower by two stages.

One example of application of the confirmation sheet 50 is explained below. On the confirmation sheet 50, the images of the originals (document) D are printed in a reduced form. If it is difficult to confirm the image, the page is printed with the full size for confirmation. In this case, the check area 58 of the full-size object printing specifying area 55 is painted out and one of the check areas of the check area 62 of the image to be printed with the full size is painted out. Then, the whole portion of the confirmation sheet 50 is read by the scanner section 11. At this time, the originals O are not attached and only the confirmation sheet 50 is read.

Then, only the image having the check area 62 marked is printed by the printer section 12.

If it is necessary to reread all of the originals O in the same condition, the check area 59 of the whole page rereading specifying area 56 is painted out. Then, the originals O are attached to all of the confirmation sheets 50 and placed on the original table of the ADF 11a and they are read by the scanner section 11.

If it is necessary to reread only the third page in the same condition, the rereading area 63 of the third page is painted out. Then, all of the originals O are attached to all of the confirmation sheets 50 and placed on the original table of the ADF 11a and they are read by the scanner section 11.

Further, if it is desired to read only the fourth page with the density of 600 dpi, the 600 dpi specifying check area 63 of the density specifying area 64 of the fourth page is painted out. Then, all of the originals O are attached to all of the confirmation sheets 50 and placed on the ADF 11a and they are read by the scanner section 11.

Further, if it is desired to read only the fifth page with the concentration lower by one stage, the one-stage-lighter reading check area 71 of the density specifying area 64 of the fifth page is painted out. Then, all of the originals O are attached to all of the confirmation sheets 50 and placed on the ADF 11a and they are read by the scanner section 11.

It is also possible to simultaneously set various conditions for a plurality of pages. For example, if it is desired to read the third page with the concentration higher by two stages, the six page with the concentration lower by one stage, the seventh page with the density of 200 dpi, the eighth page with the concentration lower by two stages and the ninth page with the density of 600 dpi, then the corresponding specifying portions of the check areas 62 of the respective pages are painted out, all of the originals O are attached to all of the confirmation sheets 50 and placed on the ADF 11a and they are read by the scanner section 11.

When the confirmation sheet 50 or original O is read by the scanner section 11, the CPU 13 stores the read image into the RAM 15. The CPU 13 determines whether or not a bar code is present in a position of the read image stored in the RAM 15 which corresponds to the position of the bar code display area 54, and if the bar code is present, reading of the confirmation sheet 50 is determined based on the contents of the bar code.

If reading of the confirmation sheet 50 is determined, the CPU 13 determines whether or not the check areas 58, 59 of the read image stored in the RAM 15 are painted out and whether or not the reread area 63, the check areas of the density specifying area 64 and the check areas 69, 70, 71 of the concentration specifying area 65 of the check area 62 of each image are painted out and determines corresponding specifying processes based on the result of above determinations.

For example, if it is determined that the check area 58 is painted out, specification of full-size object printing is determined and if it is determined that the check area 59 is painted out, specification of whole page rereading is determined.

Further, if it is determined that the rereading area 63 of the check area 62 of each image is painted out, specification of rereading of a corresponding page of the image in the same condition is determined, if it is determined that one of the check areas 66, 67, 68 of the density specifying area 64 of the check area 62 of each image is painted out, specification of the density corresponding to the painted-out check area of a corresponding page of the image is determined and if it is determined that one of the check areas 69, 70, 71 of the concentration specifying area 65 of the check area 62 of each image is painted out, specification of the concentration corresponding to the painted-out check area of a corresponding page of the image is determined.

Figures 13, 14:
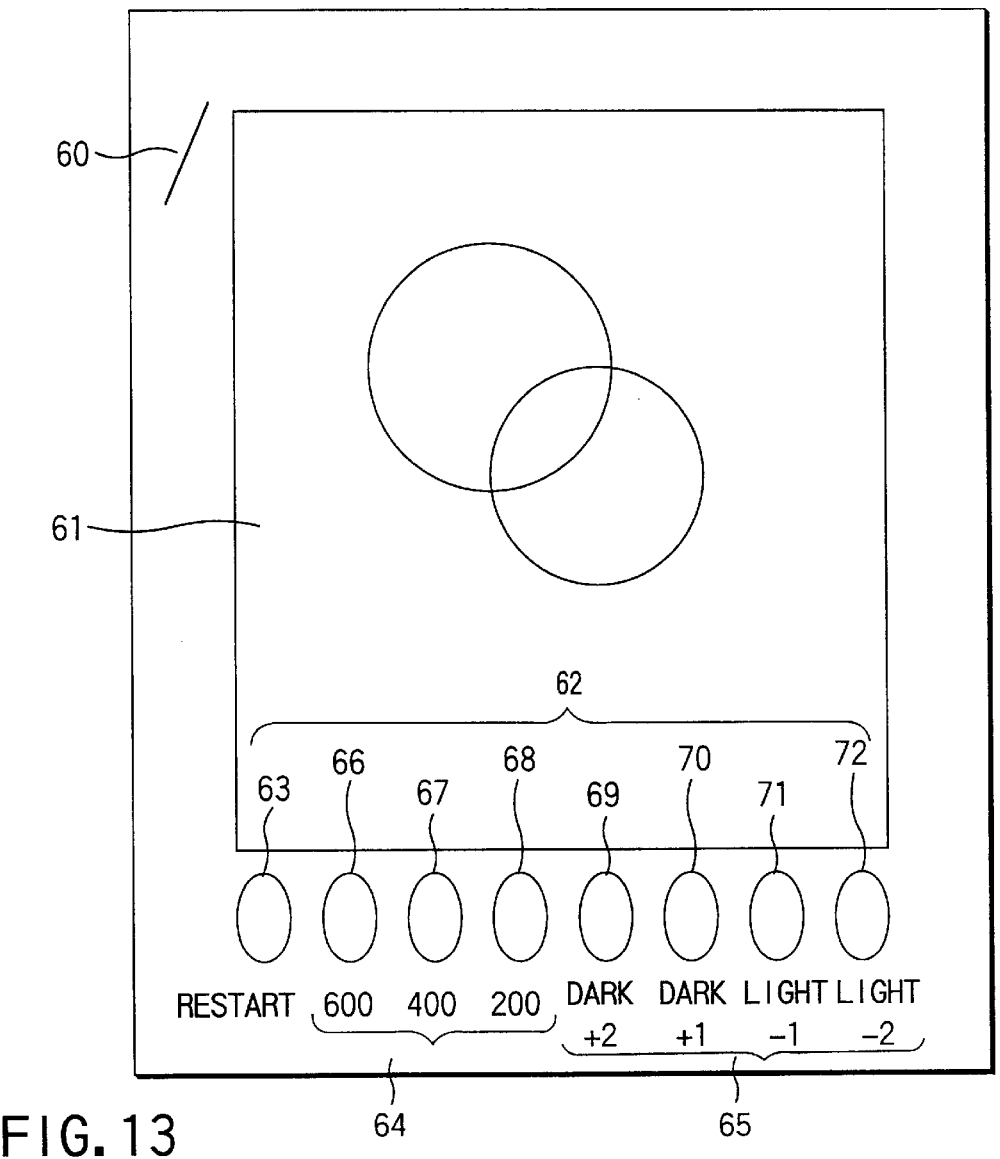
FIG. 13 is an enlarged view showing part of a confirmation sheet to be printed by the digital copying machine.
FIG. 14 is a diagram showing one example of a sheet ID management table for managing a confirmation sheet printed by the digital copying machine.

Next, a sheet ID attached to the confirmation sheet 50 is explained. The confirmation sheet 50 confirms that the sheet is the confirmation sheet 50 or not and the type of the confirmation sheet 50 which deals with what kind of image is used. The management of the sheet ID is effected in the sheet ID management table 80. The sheet management table 80 is stored in the HDD 16. As shown in FIG. 14, the sheet management table 80 has a sheet ID field 81, job ID field 82, image page number field 83 and pointer-to-image field 84.

The sheet ID is stored in the sheet ID field 81. A serial number is issued so that the number of the sheet ID will not overlap. A job ID indicating a job of the job ID management table 30 which is associated with the image of the confirmation sheet 50 indicated by the sheet ID is stored in the job ID field 82. The number of pages of images printed on the confirmation sheet 50 is stored in the image page number field 83. Data indicating a file of the read image is stored in the pointer-to-image field 84. In this example, an image of job ID4 is associated with the confirmation sheet 50 of sheet ID "11101", the first to ninth pages are printed and the image file is File 004. The sheet ID is indicated by a bar code on the confirmation sheet 50.

The sheet ID is known by reading the bar code and the job ID and the page and image file printed on the sheet can be confirmed.

Figure 15:
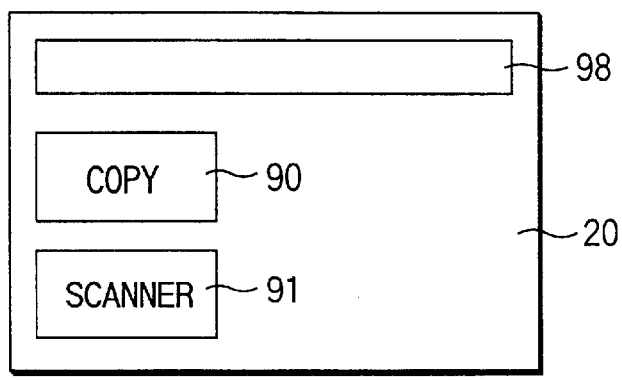
FIG. 15 is a view showing one example of display of a control panel for setting the scanner mode on the digital copying machine.

Next, a case wherein the originals O are read by the digital copying machine 3 is explained. First, an example in which the contents are displayed on the control panel 19 is shown. As shown in FIG. 15, an initial screen (standby screen) is first displayed on the control panel 19. At this time, a copy button 90, scanner button 91 and guidance display 98 are displayed. The copy button 90 is depressed when it is desired to change the mode of the digital copying machine 3 to the copy mode when the digital copying machine 3 is set in another mode such as the print mode. The scanner button 91 is depressed when it is desired to operate the digital copying machine 3 as the scanner.

Figure 16:
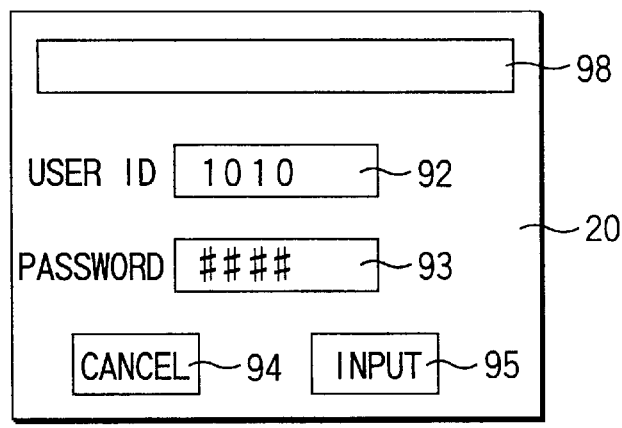
FIG. 16 is a view showing one example of display of an input screen of the control panel for inputting a user ID and password to confirm a user on the digital copying machine.

If the scanner button 91 is depressed, the screen is changed as shown in FIG. 16. On this screen, a user ID input area 92, password input area 93, cancel button 94 and input button 95 are displayed.

The user ID input area 92 is an area in which the user ID input via the ten key (not shown) of the digital copying machine 3 is displayed. Input characters are displayed. The password input area 93 is an area in which the input state of the password via the ten key (not shown) of the digital copying machine 3 is displayed. In this area, input characters are not displayed. Instead of the characters, marks "#" or "*" are displayed.

By depressing the cancel button 94, the preceding state which is the state shown in FIG. 15 is displayed. If the input button 95 is depressed after inputting the user ID, the password input accepting state is set and if it is depressed after inputting the password, the next state is displayed. At this time, if inputting of the user ID and password is terminated, the user ID management table 40 confirms to this effect and the correct user is determined. If an incorrect value is input, the state is not changed to the next state, information indicating that the incorrect value is input is displayed and then the state is set to the standby state shown in FIG. 15.

Figure 17:
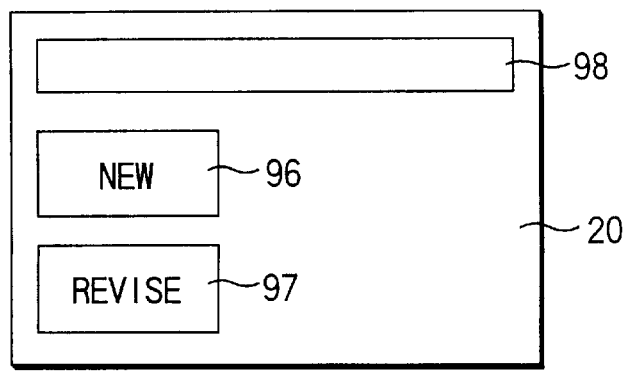
FIG. 17 is a view showing one example of display of an input screen of the control panel for inputting information indicating whether reading of the original is new or for revision or correction on the digital copying machine.

If the user ID and password are input in the state of FIG. 16 and they are determined to be correct, the state shown in FIG. 17 is displayed. On this screen, a new button 96 and revise or correction button 97 are displayed. The new button 96 is depressed when a new original O is read. The revise button 97 is depressed when the confirmation sheet 50 attached to the originals is read. The new button 96 is depressed in the case of new original and the revise button 97 is depressed when correction is made on the confirmation sheet 50 after the original is read.

Figure 18:
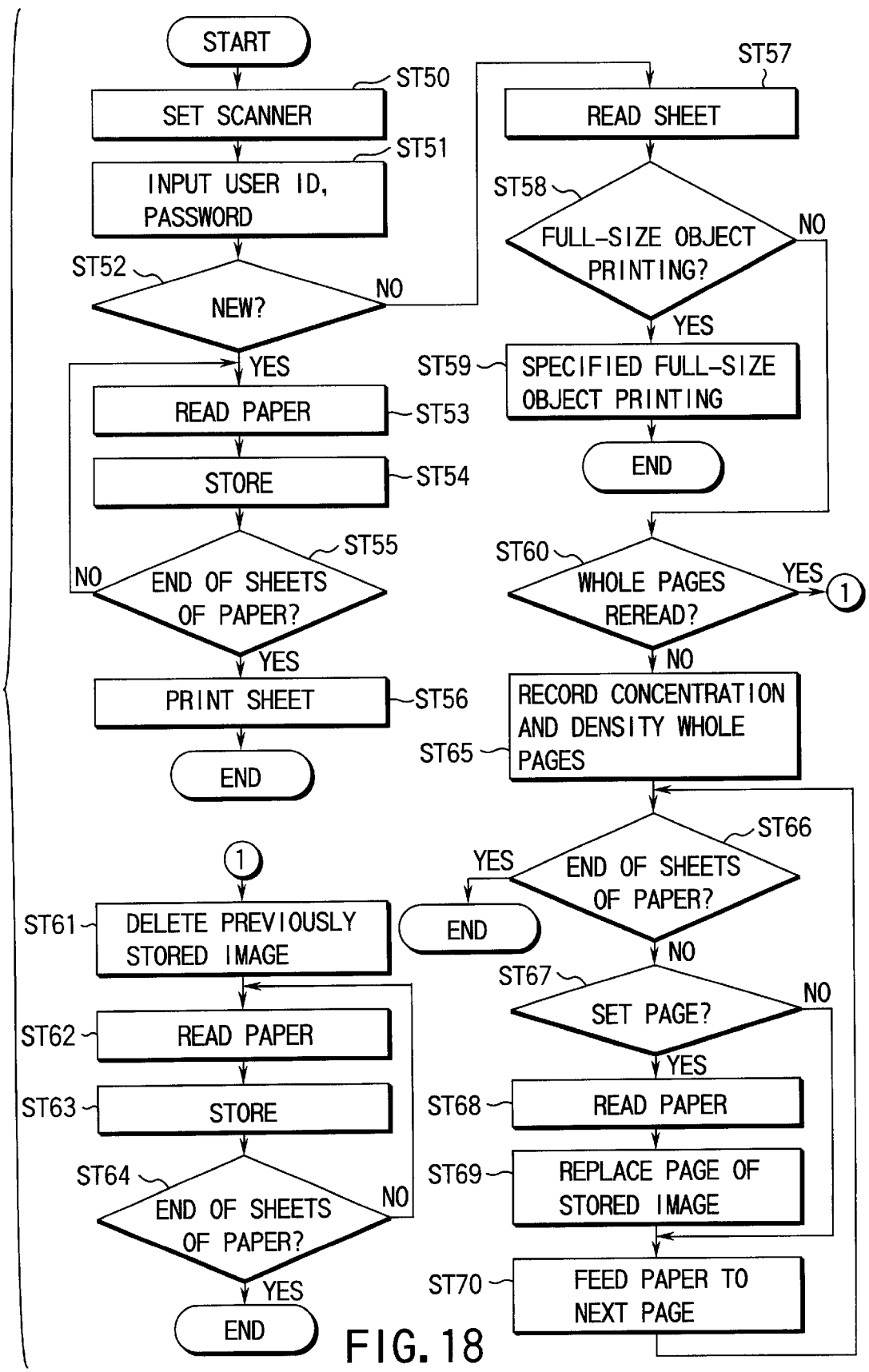
FIG. 18 is a flowchart for illustrating the scanner operation on the digital copying machine.

Next, the schematic scanning operation of the digital copying machine 3 is explained with reference to the flowchart shown in FIG. 18.

First, the scanner button 91 is depressed on the screen of the control panel 19 shown in FIG. 15 (step ST50). Then, the user ID and password are accepted on the screen of the control panel 19 shown in FIG. 16 (step ST51). Next, the screen of the control panel 19 shown in FIG. 17 is obtained. At this time, whether the new button 96 or revise button 97 is depressed is determined (step ST52).

At this time, if the new button 96 is depressed, the originals O placed on the original table of the ADF 11a are read (step ST53). Then, the images of the originals O read are stored into the HDD 16 (step ST54). After this, it is determined whether the originals O placed on the original table of the ADF 11a come to an end or not (step ST55). If the original O still remains on the original table of the ADF 11a, the step ST53 is effected again to read a next original O.

Then, if it is determined in the step ST55 that the originals O are no more present on the original table of the ADF 11a, the confirmation sheet 50 is printed according to the number of pages of the originals O (step ST56). Then, the new reading process for the originals O is terminated.

If the revise or correction button 97 on the control panel 19 is depressed in the step ST52, the confirmation sheet 50 or the confirmation sheet 50 and originals O are placed on the original table of the ADF 11a. Therefore, only the confirmation sheet 50 is first read (step ST57). Then, whether or not the check area 58 of the full-size object printing specifying area 55 is painted out is determined (step ST58). If the check area 58 is painted out, the page to be printed with the full size is read from (the painted-out state of the reread area 63, for example, of) the confirmation sheet 50 and only the specified page is read out from the HDD 16 and an image of full size is printed by the printer section 12 (step 59).

If it is determined in the step ST58 that the check area 58 of the full-size object printing specifying area 55 is not painted out, whether or not the check area 59 of the whole page rereading specifying area 56 of the confirmation sheet 50 is pained out is determined (step ST60). If it is painted out, the image which is previously read and stored in the HDD 16 is deleted (step ST61).

Then, the originals O placed continuously to the confirmation sheet 50 on the original table of the ADF 11a are read (step ST62). The image of the original O read is stored into the HDD 16 (step ST63). After this, whether or not the original O placed on the original table of the ADF 11a comes to an end is determined (step ST64). If the original O still remains on the original table of the ADF 11a, the step ST62 is effected again to read a next original O. Then, the process is terminated when the originals O placed on the original table of the ADF 11a become no more present on the original table.

If it is determined in the step ST60 that the check area 59 of the whole page rereading specifying area 56 is not painted out, the check area 62 of each page of the confirmation sheet 50 is read and data indicating all of the pages containing changes is temporarily stored into a different area (which is different from the storage area of the document image) of the HDD 16 used as a temporary memory (step ST65). Then, whether or not the originals O placed on the ADF 11a come to an end is checked (step ST66).

If the original O still remains, whether the page is a page which is stored in the step ST65 and contains the change is determined (step ST67). If it is determined that the page is a page containing the change, the paper is scanned and read (step ST68). Then, image data of only the page previously stored is replaced by new data (step ST69). The original O is changed to the next page (step ST70).

After this, the process is returned to the step ST66 to determine whether or not the originals O on the original table of the ADF 11a come to an end, and if the originals are no more present on the original table, the process is terminated. Further, whether or not the page is a page which is stored as the page containing the change is determined in the step ST67, and if it is determined that the page is a page containing no change, the process proceeds to the step ST70. Thus, the page having no change is not actually scanned and the original is changed to the next page. The actual operation was explained above.

As described above, adjustment of actual concentration can be made and inputting of the actual image and data for correction can be easily attained while observing the reduced image on the confirmation sheet.

Further, in a case where only a specified page of originals of plural pages is scanned again, all of the originals are placed on the original table of the ADF without extracting the page from the originals and it can be scanned again. Therefore, it is not necessary to set the pages in a disorderly state. Since only the necessary page is scanned, time can be saved.

Therefore, specification of rescanning can be easily made and the sheaf of originals (document) can be kept in order.

Further, in the image processing system having a plurality of image output devices and an image input device commonly used by the image output devices on the local network, an image input via the image input device can be instantly confirmed and correction for the read image can be easily made.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for storing images of originals, comprising:
    a reading step of sequentially feeding a plurality of originals in each document unit and reading images of the originals;

a storing step of storing the images read in said reading step;

an output step of outputting the images read in said reading step;

a setting step of setting a rereading process by said reading step based on the output of said output step;

a selecting step of selecting the original to be reread by said setting step;

a processing step of sequentially feeding the plurality of originals read by said reading step again by said reading step and rereading the images of the originals selected by said selecting step; and a replacing step of replacing a corresponding images of the originals stored by said storing step with the images of the originals reread by said processing step.

2. The method according to claim 1, wherein the method for storing images of originals is commonly used by at least one image output device connected thereto via a network.

3. The method according to claim 1, wherein said processing step includes a second processing step of outputting the images of the originals reread by said processing step for confirmation by use of said output step.

4. An image processing apparatus comprising:

reading means for sequentially feeding a plurality of originals in each document unit and reading images of the originals;

storing means for storing the images read by said reading means;

display means for displaying the images read by said reading means;

setting means for setting a rereading process by said reading means based on the display of said display means;

selecting means for selecting an original to be reread by said setting means;

processing means for sequentially feeding the plurality of originals read by said reading means again by use of said reading means and rereading the images of the originals selected by said selecting means; and replacing means for replacing a corresponding images of the originals stored by said storing means with an images of the originals reread by said processing means.

5. The image processing apparatus according to claim 4, wherein said display means includes specifying means for specifying a printing form in which the images read by said reading means are printed from various printing forms and printing means for printing the original image in each document unit in the printing form specified by said specifying means.

6. The image processing apparatus according to claim 5, wherein the various printing forms specified by said specifying means include a full-size object copying form for printing a read image with full size, a reducing/synthesizing form for reducing and printing each image, an upper portion extracting/synthesizing form for printing only an upper portion of each image, a central portion extracting/synthesizing form for printing only a central portion of each image and a lower portion extracting/synthesizing form for printing only a lower portion of each image.

7. The image processing apparatus according to claim 5, wherein originals to be reread are selected by said selecting means after printing by said printing means.

8. The image processing apparatus according to claim 4, wherein the images of the originals reread by said processing means are printed by said printing means.

9. The image processing apparatus according to claim 4, further comprising determination means for determining whether or not the number of originals in each document unit read by said reading means and stored by said storing means coincides with the number of originals in each document unit reread by said processing means and second processing means for causing said replacing means to effect the replacing process when said determination means detects the coincidence in the number of originals and informing an abnormal state when said determination means does not detect the coincidence.

10. The image processing apparatus according to claim 9, wherein the operation for informing the abnormal state by said second processing means is to inform that an error occurs in a first reading process by said reading means in a case where the number of originals in each document unit read by said reading means and stored by said storing means is smaller than the number of originals in each document unit reread by said processing means and inform that an error occurs in the rereading process by said processing means in a case where the number of originals in each document unit read by said reading means and stored by said storing means is larger than the number of originals in each document unit reread by said processing means.

11. The image processing apparatus according to claim 4, wherein the image processing apparatus is commonly used by at least one image output device connected thereto via a network.

12. An image processing apparatus comprising:

reading means for sequentially feeding a plurality of originals in each document unit and reading images of the originals;

storing means for storing the images of the originals read by said reading means;

printing means for reducing a plurality of images read by said reading means to print the reduced images on a printing medium for confirmation, printing a description frame for specifying a rereading process and a description frame for specifying change of a rereading parameters for each reduced image on the printing medium for confirmation, and printing information indicating the printing medium for confirmation;

determining means for determining specification of the rereading process and specification of change of the rereading parameters for each image according to the contents of the description frame for specifying the rereading process and the description frame for specifying the parameters at the rereading time which are attached to each reduced image when the printing medium for confirmation is read by said reading means and it is determined that the printing medium for confirmation is read according to the information indicating the printing medium for confirmation based on the thus read image of the printing medium for confirmation; and processing means for causing said reading means to selectively read images of the originals corresponding to the images for which specification of the rereading process is determined by said determining means while changing the parameters at the reading time according to specification of change of the rereading parameters determined by said determining means.

13. The image processing apparatus according to claim 12, which further comprises feeding means for sequentially feeding the printing medium for confirmation and a document including a plurality of originals corresponding to the printing medium for confirmation which are placed on said reading means and in which said determining means and said processing means operate when the originals placed on said reading means are sequentially fed by said feeding means.

14. The image processing apparatus according to claim 12, further comprising replacing means for replacing corresponding images of the originals stored by said storing means with the images of the original read by said processing means.

15. The image processing apparatus according to claim 12, wherein said printing means reduces a plurality of images read by said reading means to print the reduced images on the printing medium for confirmation, prints a description frame for indicating whether or not full-size object printing is executed and a description frame for specifying full-size object printing for each reduced image on the printing medium for confirmation, and prints information indicating the printing medium for confirmation, said determining means determines specification of full-size object printing for each image according to the contents of the description frame for indicating whether or not the full-size object printing is executed and the description frame attached for each image for specifying the full-size object printing when the printing medium for confirmation is read by said reading means and it is determined that the printing medium for confirmation is read according to the information indicating the printing medium for confirmation based on the thus read image of the printing medium for confirmation, and said processing means reads out the image of the original corresponding to the image for which specification of the full-size object printing is determined by said determining means from said storing means and causes said printing means to print the readout image with the readout image size.

16. The image processing apparatus according to claim 12, in which said printing means reduces a plurality of images read by said reading means to print the reduced images on the printing medium for confirmation, prints a description frame for specifying rereading of the images of all of the originals on the printing medium for confirmation, and prints information indicating the printing medium for confirmation, said determining means determines specification of rereading of the images of all of the originals according to the contents of the description frame for specifying rereading of the images of all of the originals when the printing medium for confirmation is read by said reading means and it is determined that the printing medium for confirmation is read according to the information indicating the printing medium for confirmation based on the thus read image of the printing medium for confirmation and which further comprises replacing means for replacing a corresponding images of the original stored by said storing means with the images of the originals read by said determining means.

17. The image processing apparatus according to claim 12, wherein the image processing apparatus is commonly used by at least one image output device connected thereto via a network.

* * * * *